(12) United States Patent
Kuroda et al.

(10) Patent No.: US 7,766,429 B2
(45) Date of Patent: Aug. 3, 2010

(54) ROTATION LOCK DEVICE

(75) Inventors: Masato Kuroda, Nisshin (JP);
Takayuki Endou, Toyoake (JP); Hideki Uramichi, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 200 days.

(21) Appl. No.: 12/088,012

(22) PCT Filed: Sep. 7, 2006

(86) PCT No.: PCT/JP2006/317763

§ 371 (c)(1),
(2), (4) Date: Jul. 10, 2008

(87) PCT Pub. No.: WO2007/034683

PCT Pub. Date: Mar. 29, 2007

(65) Prior Publication Data

US 2009/0256409 A1    Oct. 15, 2009

(30) Foreign Application Priority Data

Sep. 26, 2005    (JP) .............................. 2005-278330

(51) Int. Cl.
*B60N 2/02*    (2006.01)
(52) U.S. Cl. .................................................. 297/367 P
(58) Field of Classification Search ................ 297/366, 297/367 R, 368, 369, 367 P
See application file for complete search history.

(56) References Cited

U.S. PATENT DOCUMENTS 4,348,050 A *    9/1982  Letournoux et al. ......... 297/365
4,770,464 A       9/1988  Pipon et al.
6,722,738 B2      4/2004  Uramichi
6,758,525 B2 *    7/2004  Uramichi .................... 297/366
6,854,802 B2 *    2/2005  Matsuura et al. ........ 297/367 R
2002/0043852 A1   4/2002  Uramichi

FOREIGN PATENT DOCUMENTS

| EP | 0250290 | 12/1987 |
|---|---|---|
| EP | 1197377 | 12/2003 |
| JP | 1-104201 | 4/1989 |
| JP | 2001-157615 | 6/2001 |
| JP | 2002-209660 | 7/2002 |
| JP | 2003-118447 | 4/2003 |

OTHER PUBLICATIONS

English language Abstract of JP 2001-157615, Jun. 12, 2001.
English language Abstract of JP 2002-209660, Jul. 30, 2002.
English language Abstract of JP 1-104201, Apr. 21, 1989.
English language Abstract of JP 2003-118447, Apr. 23, 2003.

* cited by examiner

*Primary Examiner*—Milton Nelson, Jr.
(74) *Attorney, Agent, or Firm*—Greenblum & Bernstein, P.L.C.

(57) ABSTRACT

A reclining device of a vehicle seat including a ratchet, a guide, three pawls and a rotating cam. Three spacing distances are defined due to such positioning of the three pawls, and one of the spacing distances is determined so as to be greater than the remaining two spacing distances. A non-toothed raised flat portion is formed in a portion of an inner circumferential surface of an inner toothed portion of the ratchet at a single site in a circumferential direction thereof. The raised flat portion is protruded radially inwardly beyond tips of inner teeth. The smaller remaining two spacing distances are determined so as to be smaller than a circumferential length of the raised flat portion.

5 Claims, 11 Drawing Sheets

ROTATION LOCK DEVICE

TECHNICAL FIELD

The present invention relates to a rotation lock device. More particularly, the present invention relates to a rotation lock device that is disposed between a first member and a second member that are coaxially relatively rotatably positioned and connects the first member and the second member, and that can be positioned in an unlocked condition that allows relative rotation of the first member and the second member and a locked condition that prevents the relative rotation of the first member and the second member and maintain that condition.

BACKGROUND ART

A known example of a rotation lock device is a reclining device for a vehicle seat that is shown by, for example, Japanese Laid-Open Patent Publication No. 2001-157615. In the device disclosed, a seat back is connected to a seat cushion via a reclining device, so that a tilting angle of the seat back can be adjusted.

In the reclining device, a disc-shaped ratchet bonded to the seat back and a disc-shaped guide bonded to the seat cushion are assembled together in a manner that their respective disc surfaces contact each other, so as to be relatively rotated. The ratchet has an inner toothed portion that is formed along an outer periphery thereof. The inner toothed portion has inner teeth that are formed in an inner peripheral surface thereof. The inner toothed portion is formed by cylindrically protruding in an axial direction of the ratchet, so that the inner teeth are exposed to an inner space defined by the two discs in a condition that the ratchet is combined to the guide. Conversely, the guide has a depressed guide portion formed in the inner disc surface that faces to the ratchet, so that a plurality of pawls having outer teeth are received therein. The guide portion guides each of the pawls, so that the pawls can move only in a radial direction of the guide. A cam that is rotated by an unlock lever for reclining operation is disposed at a central portion of the guide. The cam is normally biased so as to push the pawls radially outwardly, so as to maintain a condition in which the outer teeth of the pawls mesh with the inner teeth of the ratchet. As a result, relative rotation of the ratchet and the guide is restricted, so that the reclining device is maintained in a locked condition. When operation of the unlock lever is performed, the cam stops pushing the pawls outwardly, so as to release a meshing condition between the outer teeth of the pawls and the inner teeth of the ratchet. As a result, the relative rotation of the ratchet and the guide is allowed, so that the reclining device can be switched to an unlocked condition. When the operation of the unlock lever is stopped, the cam is rotated by a biasing force. As a result, the pawls are pushed radially outwardly, so that the reclining device can be automatically returned to the locked condition.

The reclining device described above has a free zone in which the reclining device can be maintained in the unlocked condition even if the operation of the unlock lever is stopped. The free zone is formed in a rotational region which is not used when the seat is in a use condition, for example, a rotational region in which the seat back is forwardly tilted with respect to the seat cushion. In particular, the free zone is formed by partially providing a non-toothed raised flat portion on the inner peripheral surface of the inner toothed portion of the ratchet, which portion is formed so as to be protruded radially inwardly beyond tips of the inner teeth. That is, in the region in which the raised flat portion is formed, either one of the pawls, when pushed radially outwardly, may contact the raised flat portion that is protruded inwardly beyond the inner teeth, so that rotation of the cam to push the other pawls outwardly is restricted. As a result, the outer teeth of the pawls and the inner teeth of the ratchet are prohibited from meshing with each other. Thus, in the rotation region in which this raised flat portion is formed, it is possible to change an inclination angle of the seat back without maintaining the operating condition of the unlock lever. As a result, it is possible to easily perform, for example, folding operation of the seat back onto the seat cushion.

DISCLOSURE OF THE INVENTION

Problem to be Solved by the Invention

However, in the related-art technique disclosed in Patent Document 1 described above, the raised flat portion and the pawls are positioned at a plurality of positions that are arranged in axial symmetry in a circumferential direction, so that a lock zone and the free zone can repeatedly appear a plurality of times intermittently in the circumferential direction. That is, in this related-art technique, three or more pawls are positioned in the circumferential direction, so that lock strength of the reclining device can be ensured. However, it is difficult to ensure a wide rotation region for a combination of the lock zone and the free zone that are continuous with each other.

The present invention has been made to solve the problems described above. It is an object of the present invention to make it possible that a continuous wide range of lock zone and free zone can be set without additionally providing assembly components such as a free zone plate in construction in which three or more pawls are circumferentially disposed in order to improve lock strength of a rotation lock device,

MEANS FOR SOLVING THE PROBLEM

In order to solve the above-mentioned problems, the rotation lock device of the present invention has the following means.

First, a first invention is directed to a rotation lock device disposed between a first member and a second member that are coaxially rotatably positioned and connecting the first and second members each other, which device is capable of having an unlocked condition allowing relative rotation of the first and second members and a locked condition preventing the relative rotation of the first and second members. The rotation lock device includes a ratchet, a guide, three pawls and a cam. The ratchet is coaxially disposed on and connected to one of the first and second members and having a disk-shape. The ratchet has a cylindrical portion axially protruding from an outer peripheral edge portion thereof and having inner teeth that are formed in an inner circumferential surface of the cylindrical portion. The guide is coaxially disposed on and connected to the other of the first and second members and having a disk-shape. The guide is combined to the ratchet while disc surfaces thereof face each other, so as to be rotated relative to each other. The three pawls are disposed on the guide disc surface facing the ratchet at intervals in a circumferential direction thereof. The three pawls are retained on the guide, so as to be movable only in a radial direction of the guide, and having outer teeth that are formed in radially outer surfaces thereof. The cam is coaxially disposed on the guide so as to be axially rotated. The cam is capable of pushing the three pawls from inside to outside along a radial direction of the guide when it is axially rotated, thereby meshing the outer teeth of the pawls with the inner teeth formed in the inner circumferential surface of the cylindrical portion of the ratchet. Three spacing distances are defined due to circumferential positioning of the three pawls. One of the spacing distances is determined so as to be greater than the remaining two spacing distances. A raised flat portion is formed in a portion of the inner circumferential surface of the cylindrical portion of the ratchet at a single site in a circumferential direction thereof. The raised flat portion lacks the inner teeth and is protruded radially inwardly beyond tips of the inner teeth and in which the inner teeth is removed. The smaller remaining two spacing distances are determined so as to be smaller than a circumferential length of the raised flat portion.

Further, the description "a raised flat portion is formed in a portion of the inner circumferential surface at a single site in a circumferential direction thereof" may include not only the meaning that "a projection is formed at a single site so as to be continuously protruded" but also the meaning that "projections are formed at a single site so as to be intermittently protruded."

According to the first invention, in a rotation region in which the raised flat portion formed in the ratchet does not interfere with either of the pawls pushed by the cam, each of the pawls pushed by the cam meshes with the inner teeth formed in the ratchet. As a result, a locked condition in which relative rotation of the ratchet and the guide is restricted is obtained. Thus, the rotation region in which the raised flat portion does not interfere with each of the pawls is determined as a lock zone in which the rotation lock device can be placed in the locked condition. Also, in a rotation region in which the raised flat portion formed in the ratchet and either of the pawls pushed by the cam interfere with each other, the pawl pushed by the cam is prevented from moving at a position in which the pawl contacts the raised flat portion. As a result, rotation of the cam to push each of the pawls is restricted, so that an unlocked condition in which the outer teeth of each of the pawls and the inner teeth of the ratchet is prohibited form meshing with each other is obtained. Thus, the rotation region in which the raised flat portion interferes with either of the pawls is determined as a free zone in which the rotation lock device is not placed in the locked condition.

The raised flat portion is formed in a portion of the inner circumferential surface of the ratchet at a single site in a circumferential direction thereof. When the raised flat portion formed at the single site is positioned in one of circumferential regions defined between two of the pawls that define the greater spacing distance, which region does not contain the third pawl, the raised flat portion does not interfere with the pushed pawl, thereby allowing engagement of the pawl and the ratchet. Thus, the lock zone is obtained by the greater spacing distance. Further, when the raised flat portion is positioned in the regions corresponding to the remaining two smaller spacing distances that are determined so as to be smaller than the circumferential length thereof, the raised flat portion interferes with at least one of the pushed pawls that define the smaller spacing distances, thereby prohibiting the engagement of the pawl and the ratchet. Thus, the free zone continuous with the lock zone is continuously and widely obtained while including the remaining two spacing distances.

A second invention is directed to the first invention described above, wherein the three spacing distances defined due to the positioning of the three pawls are determined such that in a region in which the raised flat portion moves between the three pawls through the smaller remaining two spacing distances, at least one of the pawls defining the smaller spacing distances and the raised flat portion always contact each other when the pawls are pushed.

According to the second invention, when the raised flat portion is positioned in the circumferential regions that include the third pawl positioned between the two pawls positioned circumferentially across the two smaller spacing distances therebetween, the raised flat portion always interferes with at least one of the pushed pawls that define the smaller spacing distances.

Next, a second invention is directed to the first or second invention described above, wherein the guide is integrally provided with a support portion that is capable of contacting an outer circumferential surface of the cam and supporting the same, and wherein the support portion is positioned at the greater one of the spacing distances defined by the three pawls.

According to the third invention, the outer circumferential surface of the cam pushing the three pawls toward the inner teeth of the ratchet is applied with a reaction force of the pressing force. Since one of the spacing distances of the pawls is determined so as to be greater than the remaining two spacing distances, the reaction force may circumferentially unevenly act on the cam. However, the uneven reaction force is received by the support portion that contacts the outer peripheral surface of the cam, so as to be equalized in a circumferential direction.

Next, a fourth invention is directed to the third invention described above, wherein the support portion is formed by half blanking the disc-shaped guide in a thickness direction thereof.

According to the fourth invention, because the support portion can be integrally formed so as to axially protrude from the disc surface of the guide by half blanking the guide in the thickness direction thereof.

Next, a fifth invention is directed to the third or fourth invention described above, wherein the three pawls and the support portion are positioned on the disc surface of the guide at intervals of 90 degrees in the circumferential direction thereof.

According to the fifth invention, the three pawls and the support portion can be equi-angularly positioned in the circumferential direction of the guide. As a result, the reaction force applied to the cam when the cam presses the three pawls is supported by the support portion, so as to be uniformized in the circumferential direction.

EFFECTS OF THE INVENTION

The present invention provides the following effects by the above-mentioned means.

First, according to the first invention, the spacing distances of the three pawls that are circumferentially positioned is determined such that one of the spacing distances is greater than the remaining two spacing distances and that the smaller spacing distances is smaller than the circumferential length of the raised flat portion. Therefore, the lock strength of the rotation lock device can be increased. Further, the free zone continuous and the lock zone can be continuously and widely formed without separately providing an assembly component such as a free zone plate.

Further, according to the second invention, the arrangement and construction of the raised flat portion and the three pawls that constitute the free zone is clarified. Therefore, the construction of the first invention can be further clarified.

Further, according to the third invention, due to the support portion that is capable of uniformizing the circumferentially uneven reaction force applied to the cam, the engagement of the pawl and the ratchet can be stabilized, thereby further increasing the lock strength of the rotation lock device.

Further, according to the fourth invention, the support portion is formed by half blanking of the guide. Therefore, the support portion having high support strength can be easily formed.

Further, according to the fifth invention, the three pawls and the support portion can be equi-angularly positioned at intervals of 90 degrees in the circumferential direction. As a result, the three pawls can be pushed toward the inner teeth of the ratchet by the cam while a uniform force is applied thereto in the circumferential direction. Therefore, the lock strength of the rotation lock device can be further increased.

Figure 1:
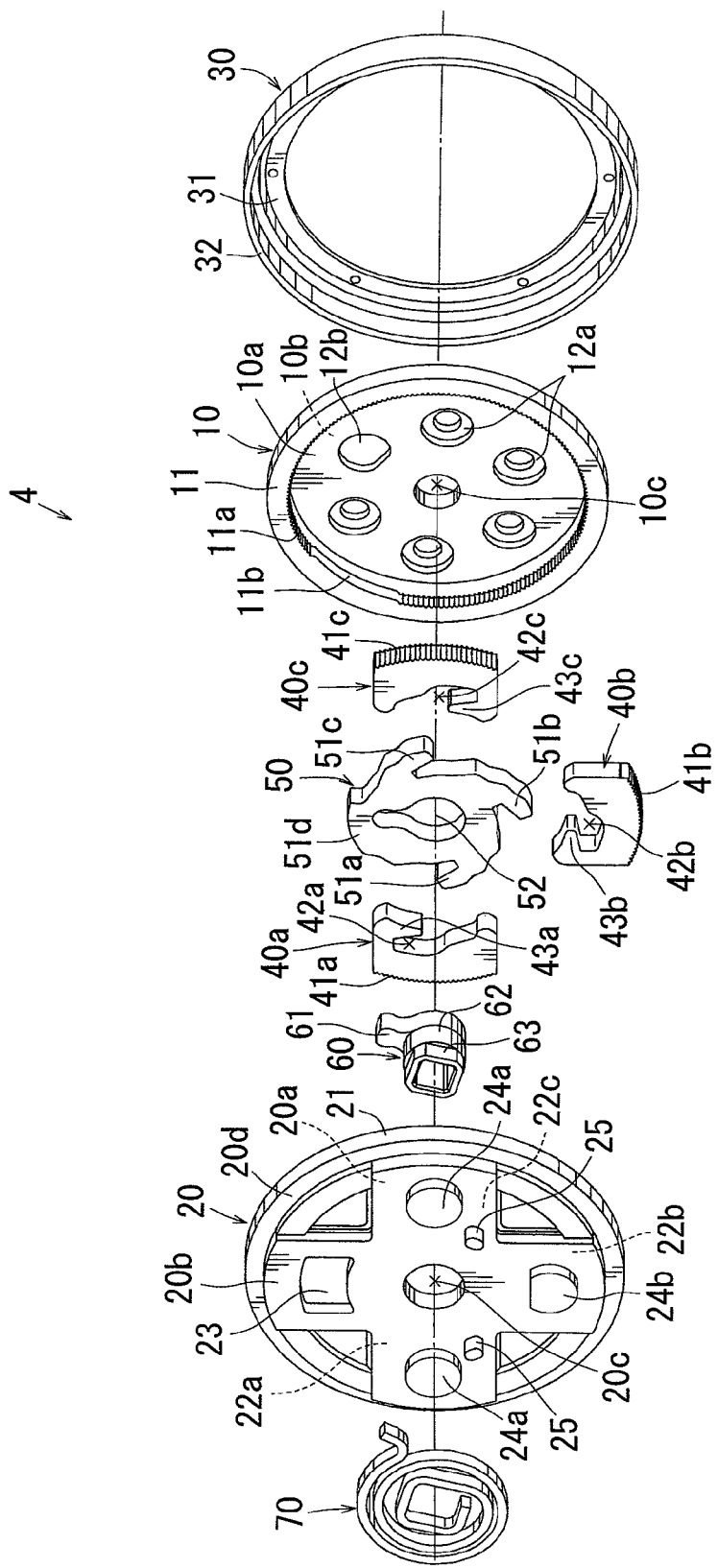
FIG. 1 is an exploded perspective view of a reclining device according to a first embodiment.

DESCRIPTION OF REFERENCE SYMBOLS 1 seat
2 seat back
2f back frame (one of a first member and a second member)
2a dowel hole
2b D-dowel hole
2c through-hole
3 seat cushion
3f cushion frame (one of the first member and the second member)
3a dowel hole
3b D-dowel hole
3c through-hole
4 reclining device (rotation lock device)
4r central axis
10 ratchet
10a inner disc surface
10b outer disc surface
10c shaft insertion hole
11 inner toothed portion (cylindrical portion)
11a inner teeth
11b raised flat portion
11c raised flat portion
11d pin member (raised flat portion)
12a dowel
12b D-dowel
20 guide
20a inner disc surface
20b outer disc surface
20c shaft insertion hole
21 surrounding portion
22a-22c guide groove portion
23 support portion
24a dowel
24b D-dowel
25 engaging portion
30 set plate
31 ratchet holding surface
32 guide holding surface
40a-40c pawl
41a-41c outer teeth
42a-42c drawing back groove
43a-43c engaging portion
50 rotating cam (cam)
51a-51c operation arm
51d support portion
52 fitting hole
60 hinge cam
61 pressing portion
62 shaft portion
63 engaging portion
70 spring member
D1 to D3 spacing distance
U operation lever
L lock zone
F free zone

BEST MODE FOR CARRYING OUT THE INVENTION

Embodiments of the best mode for carrying out the present invention will be hereinafter described with reference to the drawings. In the following embodiments, construction of a rotation lock device of the present invention is applied to a reclining device that can adjust a tilting angle of a seat back of a vehicle seat.

First Embodiment

Figure 5:
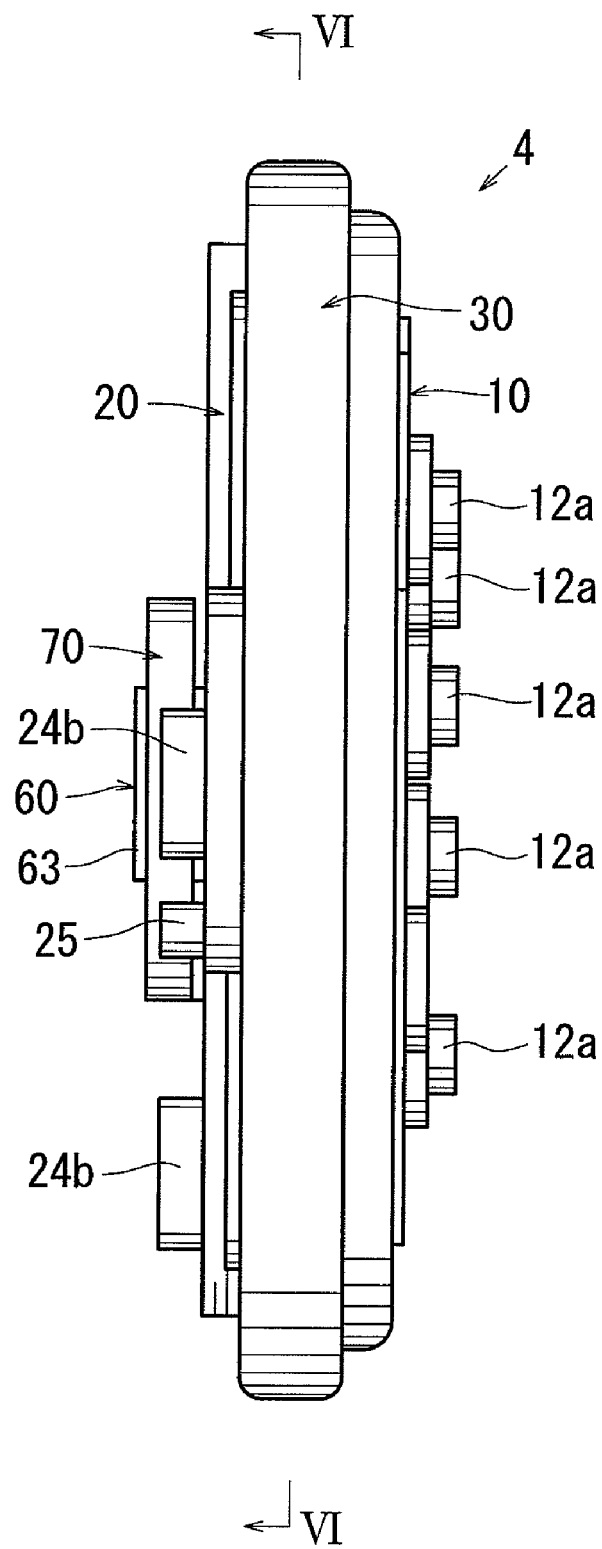
FIG. 5 is a side view of the reclining device.
Figure 6:
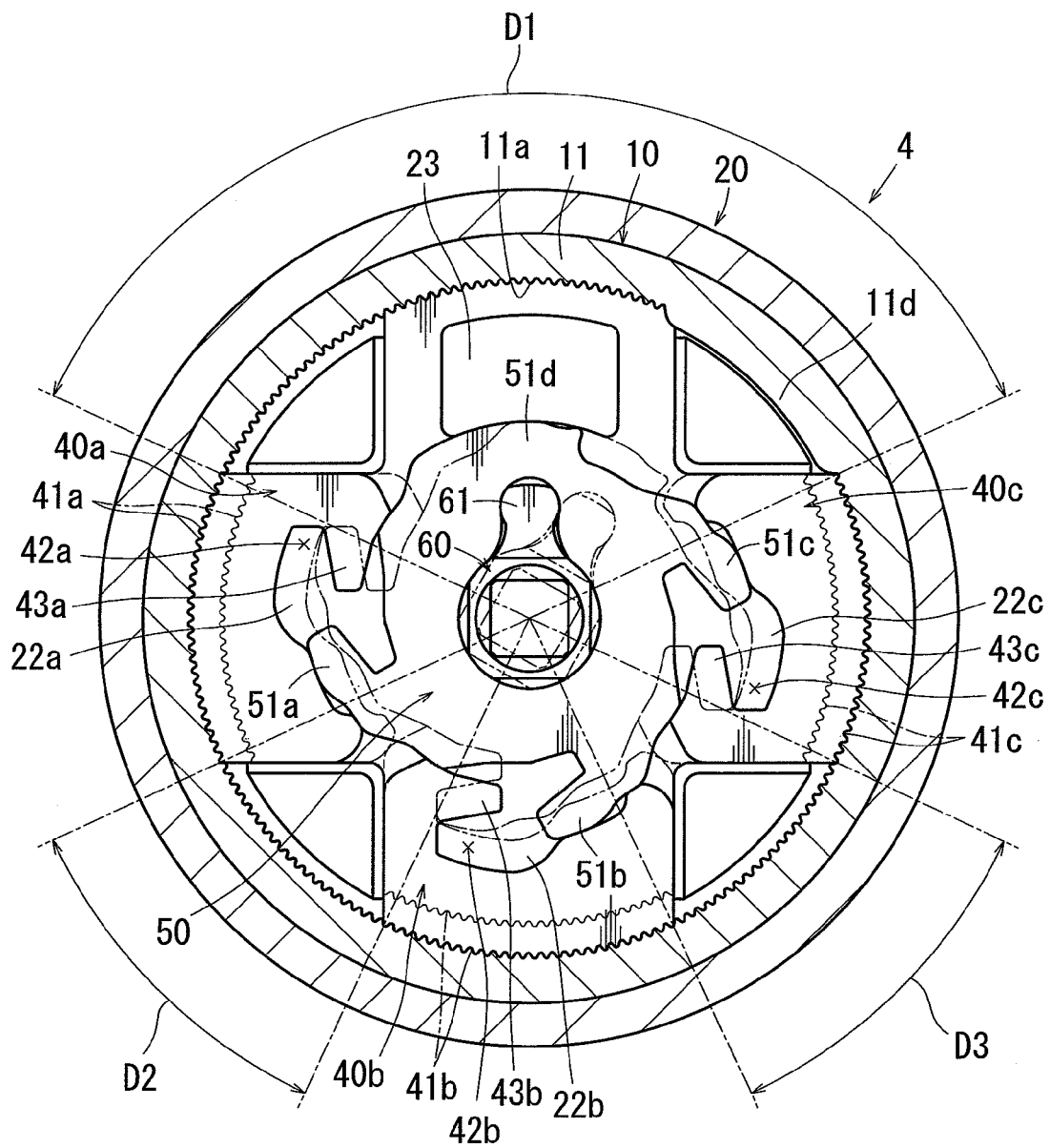
FIG. 6 is a sectional view taken along line VI-VI of FIG. 5, which illustrates an inner structure of the reclining device.

First, construction of a reclining device 4 according to a first embodiment will be described with reference to FIGS. 1 to 13. In FIG. 6, although outer teeth 41a-41c indicated by broken leader lines are drawn by solid lines, it should be construed that they are drawn by broken lines.

Figure 2:
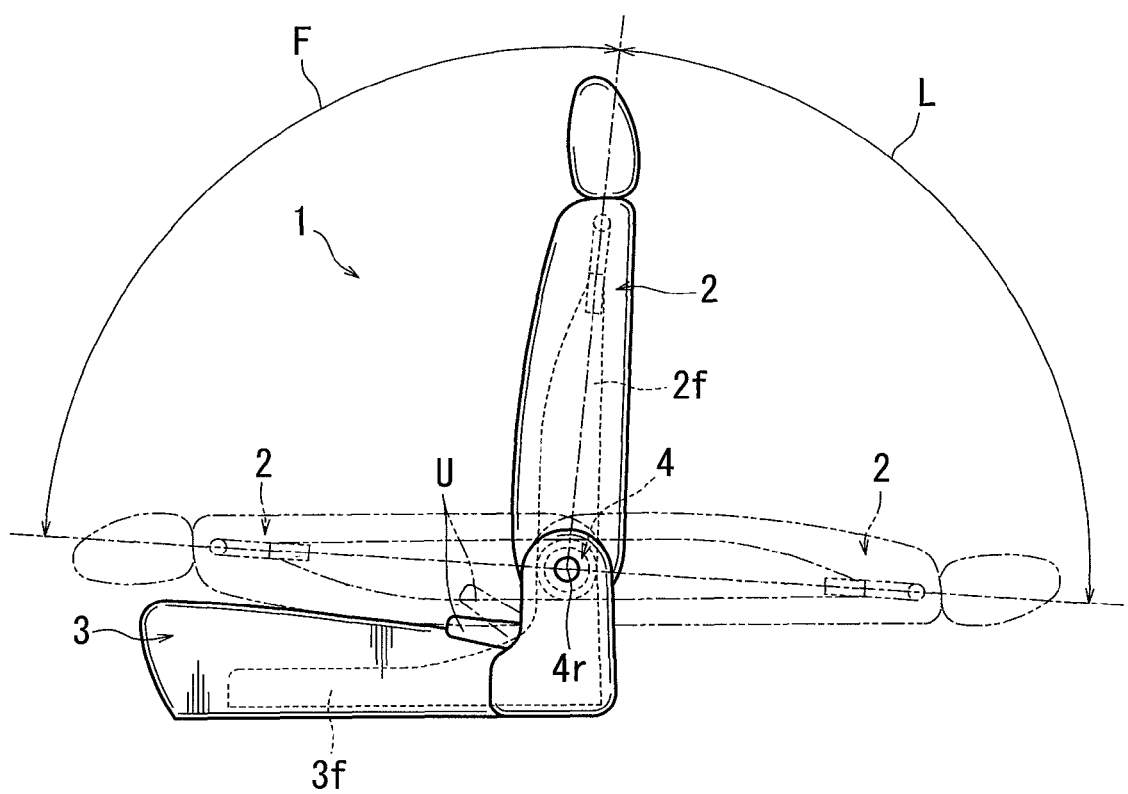
FIG. 2 is a schematic view, which illustrates a movable range of a seat back.

As shown in FIG. 2, reclining devices 4 of this embodiment is formed as connection devices that connects a seat back 2 and a seat cushion 3 of a vehicle seat 1. The reclining devices 4 are positioned on widthwise both sides of the seat 1 in pairs. The reclining devices 4 are respectively positioned between a back frame 2f constituting a frame of the seat back 2 and a cushion frame 3f constituting a frame of the seat cushion 3, so as to connect them to each other. The back frame 2f corresponds to one of a first member and a second member of the present invention, and the cushion frame 3f corresponds to the other of the first member and the second member of the present invention.

The reclining devices 4 have connection mechanisms that permit the seat back 2 to relatively rotate with respect to the seat cushion 3 about a central axis 4r. Thus, the tilting angle of the seat back 2 can be adjusted. In particular, as indicated by two broken lines in FIG. 2, the seat back 2 can be rotated over an angle range of 180 degrees between a condition in which the seat back 2 is forwardly folded onto the seat cushion 3 and a condition in which it is completely tilted backwardly. Further, the reclining devices 4 are constructed so as to be switched between unlocked conditions in which the tilting angle of the seat back 2 is adjustable and locked conditions in which a desired tilting angle can be maintained. In particular, the reclining devices 4 are normally retain in the locked conditions, so that the tilting angle of the seat back 2 can be maintained at a desired angle. Further, the reclining devices 4 can be simultaneously switched to the unlocked conditions by performing pulling operation of an operation lever U that is connected to one of the reclining devices 4 (positioned on a front side as seen in the drawing). Thus, an inclination angle of the seat back 2 can be adjusted. Further, the reclining devices 4 are constructed to be simultaneously returned to the locked conditions as the operation lever U is returned to an original position by a biasing force when the pulling operation of the operation lever U is stopped. As a result, the seat back 2 is maintained at an inclination angle thus adjusted.

The above-mentioned construction will be described in more detail. The reclining devices 4 are respectively constructed such that locking and unlocking motion can be switched by axially rotating operation shafts (not shown) that are positioned at their central portions thereof. Further, these operation shafts are integrally connected to an elongated rod-shaped connection member that is disposed in the seat 1 so as to extend in a widthwise direction. One of the operation shafts is integrally connected to the operation lever U described above. Therefore, the pair of right and left reclining devices 4 are simultaneously switched from the locked conditions to the unlocked conditions when the pulling up operation of the operation lever U is performed.

A biasing spring (not shown) is positioned between the seat back 2 and the seat cushion 3, so as to bias the seat back 2 in a rotational direction that permit the seat back 2 to rotate forwardly toward the seat cushion 3. Thus, the seat back 2 is constructed to be automatically folded forwardly when the reclining devices 4 are switched to the unlocked conditions.

Each of the reclining devices 4 has a lock zone L and a free zone F that are set in a movable range in which the seat back 2 relatively rotates.

The former or the lock zone L is a region in which the reclining devices 4 are returned to the locked conditions when the pulling operation of the operation lever U described above is stopped. The lock zone L is formed in a rotation region in which a user seated on the seat 1 uses the seat back 2 as a backrest. In this embodiment, it is formed in an angle region in which the seat back 2 is in a backwardly tilted position.

The latter or the free zone F is a region in which the reclining devices 4 are maintained in the unlocked conditions even if the pulling operation of the operation lever U once performed is stopped. The free zone F is formed in a rotation region which is not used when the seat 1 is used. In this embodiment, it is formed in an angle region in which the seat back 2 is in a forwardly tilted position. Thus, due to the free zone F thus formed, an operation for folding the seat back 2 onto the seat cushion 3 can be performed while the pulling operation of the operation lever U is stopped. Therefore, such an operation can be easily performed.

Next, the construction of the reclining devices 4 will be described in detail. As described above, although the reclining devices 4 are positioned on widthwise right and left sides of the seat 1 in pairs, they are substantially the same construction. Therefore, in the following description, only the construction of one of them will be described.

That is, as shown in FIG. 1, the reclining device 4 is formed by combining a ratchet 10, a guide 20, a set plate 30, pawls 40a-40c, a rotating cam 50, a hinge cam 60 and a spring member 70 as a unit. Further, the rotating cam 50 corresponds to a cam of the present invention.

In particular, the ratchet 10 is formed to have substantially a disc-shape. The ratchet 10 is formed with a cylindrical inner toothed portion 11 that is formed along a periphery thereof and axially protruding from an inner disc surface 10a. Further, the inner toothed portion 11 corresponds to a cylindrical portion of the present invention. The inner toothed portion 11 is formed by half blanking the ratchet 10 in a thickness direction thereof. The inner toothed portion 11 has inner teeth 11a that are formed in a cylindrical inner circumferential surface thereof. However, a non-toothed raised flat portion 11b is formed in the inner circumferential surface at a portion in a circumferential direction of thereof. The raised flat portion 11b is formed so as to be protruded radially inwardly beyond tips of the inner teeth 11a.

A shaft insertion hole 10c is formed in a central portion of the disc-shaped ratchet 10, which hole is formed as an axial through-hole. The shaft insertion hole 10c is shaped such that the above-mentioned operation shaft (not shown) can be axially rotatably inserted thereinto.

Figure 10:
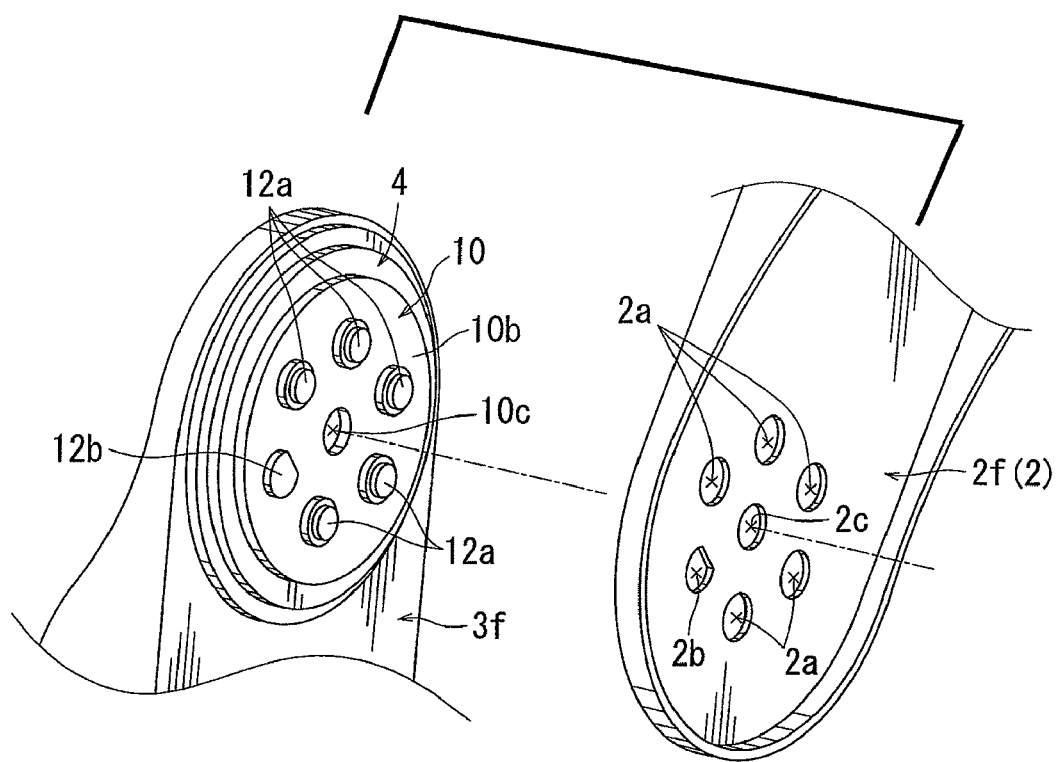
FIG. 10 is an exploded perspective view, which illustrates a bonding structure of the ratchet and a back frame.

Further, as shown in FIG. 10, dowels 12a and a D-dowel 12b are formed in an outer disc surface 10b of the ratchet 10. The dowels 12a and the D-dowel 12b are formed circumferentially in series at positions that are radially spaced apart from the shaft insertion hole 10c. The dowels 12a and the D-dowel 12b are formed by half blanking the ratchet 10 in the thickness direction thereof, so as to axially protrude from the outer disc surface 10b. The dowels 12a and the D-dowel 12b are shaped to be fitted into corresponding dowel holes 2a and a D-dowel hole 2b that are respectively formed in the back frame 2f. The D-dowel 12b is formed to have a D-shape in cross section by partly removing a cylindrical shape, so as to be distinguishable from the cylindrically shaped dowels 12a. As a result, the ratchet 10 can always be fitted to the back frame 2f while it is oriented in a predetermined direction. Therefore, the ratchet 10 and the back frame 2f can be joined to each other while the shaft insertion hole 10c of the ratchet 10 is coaxially aligned with a through-hole 2c formed in the back frame 2f. The ratchet 10 and the back frame 2f are integrally bonded to each other by performing arc welding at contact portions thereof in which the dowels 12a and the D-dowel 12b are fitted while the outer disc surface 10b of the ratchet 10 and a plate surface of the back frame 2f contact with each other.

Next, the guide 20 will be described. As shown in FIG. 1, the guide 20 is formed to have substantially a disc-shape. The guide 20 is assembled to the ratchet 10 while a disk-shaped inner disc surface 20a thereof faces the inner disc surface 10a of the ratchet 10. Further, the guide 20 is formed with a cylindrical surrounding portion 21 that is formed along a periphery thereof and protruding axially from the inner disc surface 20a. The surrounding portion 21 is formed by half blanking the guide 20 in a thickness direction thereof. The surrounding portion 21 is dimensionally determined so as to be outwardly fitted to the cylindrical inner toothed portion 11 formed in the ratchet 10, thereby surrounding the same. Therefore, in a condition that the guide 20 and the ratchet 10 have been assembled together, an outer circumferential surface of the inner toothed portion 11 of the ratchet 10 is supported by the surrounding portion 21. As a result, the inner toothed portion 11 of the ratchet 10 is supported by the surrounding portion 21 so as to be restricted from radially moving. In particular, the inner toothed portion 11 is supported so as to be relatively rotated with respect to the surrounding portion 21 while sliding along an inner circumferential surface of the surrounding portion 21. In the condition that the guide 20 and the ratchet 10 have been assembled together, the inner teeth 11a formed in the inner toothed portion 11 are exposed to an inner space defined between the ratchet 10 and the guide 20.

A shaft insertion hole 20c is formed in a central portion of the disc-shaped guide 20, which hole is formed as an axial through-hole. In the condition that the guide 20 and the ratchet 10 have been assembled together, the shaft insertion hole 20c is coaxially positioned with respect to the shaft insertion hole 10c of the ratchet 10. The shaft insertion hole 20c is shaped such that the above-mentioned operation shaft (not shown) can be axially rotatably inserted thereinto.

Further, depressed guide groove portions 22a-22c are formed in an inner disc surface 20a of the guide 20 by depressing the guide 20 toward the outer disc surface. The guide groove portions 22a-22c are formed by half blanking the guide 20 in the thickness direction thereof, so as to extend radially outwardly from a center of the guide 20. In particular, the guide groove portions 22a-22c are formed at three positions on the guide 20 that are determined at intervals of 90 degrees in a circumferential direction of the guide 20, so as to integrally extend from the center of the guide 20. Further, the pawls 40a-40c are respectively disposed in the guide groove portions 22a-22c. The guide portions 22a-22c guide the pawls 40a-40c so as to move only in a radial direction of the guide. Arrangement of the pawls 40a-40c is shown in FIG. 6.

Referring to FIG. 1 again, a projection-shaped support portion 23 is formed in the inner disc surface 20a of the guide 20 by depressing the guide 20 from the outer disc surface. The support portion 23 is formed by half blanking the guide 20 in the thickness direction thereof. The support portion 23 is formed at a position between the guide groove portion 22a and the guide groove portion 22c (a position determined at an interval of 90 degrees therefrom). FIG. 6 shows the support portion 23 that is seen from the inner disc surface of the guide 20. As shown in this drawing, a radially inwardly directed inner peripheral surface of the support portion 23 has an arcuately concaved shape that is capable of contacting a support portion 51d of the rotating cam 50 described below.

Figure 11:
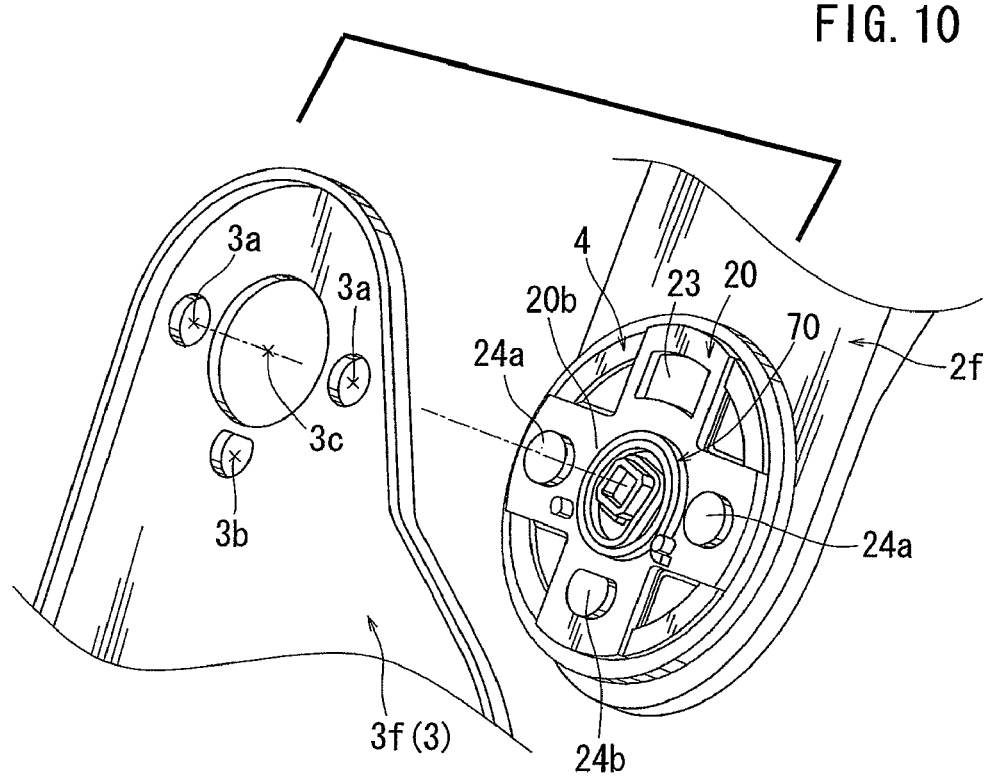
FIG. 11 is an exploded perspective view, which illustrates a bonding structure of a guide and a cushion frame.

Further, as shown in FIG. 11, dowels 24a and a D-dowel 24b are formed in an outer disc surface 20b of the guide groove portions 22a-22c. The dowels 24a and the D-dowel 24b are formed circumferentially in series at positions that are radially spaced apart from the shaft insertion hole 20c. The dowels 24a and the D-dowel 24b are formed by half blanking the guide 20 in the thickness direction thereof, so as to axially protrude from the outer disc surface 20b. The dowels 24a and the D-dowel 24b are shaped to be fitted into corresponding dowel holes 3a and a D-dowel hole 3b that are respectively formed in the cushion frame 3f. The D-dowel 24b is formed to have a D-shape in cross section by partly removing a cylindrical shape, so as to be distinguishable from the cylindrically shaped dowels 24a. As a result, the guide 20 can always be fitted to the cushion frame 3f while it is oriented in a predetermined direction. Therefore, the guide 20 and the cushion frame 3f can be joined to each other while the shaft insertion hole 20c of the guide 20 is coaxially aligned with a through-hole 3c formed in the cushion frame 3f. The guide 20 and the cushion frame 3f are integrally bonded to each other by performing arc welding at contact portions thereof in which the dowels 24a and the D-dowel 24b are fitted while the outer disc surface 20b of the guide 20 and a plate surface of the cushion frame 3f contact with each other.

As a result, upon relative rotation of the ratchet 10 that is integrally bonded to the back frame 2f shown in FIG. 10 and the guide 20 that is integrally bonded to the cushion frame 3f shown in FIG. 11, as shown in FIG. 2, the reclining device 4 rotate the seat back 2 relative to the seat cushion 3, so that the tilting angle thereof can be adjusted.

Next, referring to FIG. 1 again, the set plate 30 will be described. The set plate 30 is formed by half blanking a thin hollow disc-shaped member in a thickness direction thereof so as to have a stepped cylindrical shape (annular shape). The set plate 30 functions as a pressing member for clamping the ratchet 10 and the guide 20 that are oppositely positioned in a thickness direction thereof and are assembled together. In particular, a surface portion in an inside peripheral edge surface of the set plate 30 is formed as a ratchet holding surface 31 that contacts an outer peripheral edge of the outer disc surface of the ratchet 10. Further, the set plate 30 is bent in a stepwise fashion from the ratchet holding surface 31 to an outside peripheral edge so as to extend along the peripheral edge configuration of the ratchet 10 and the guide 20. Further, a surface portion in the outside peripheral edge of the set plate 30 is bent inwardly by crimping, so as to be formed as a guide holding surface 32 that contacts an peripheral edge of the outer disc surface of the guide 20. The set plate 30 is assembled while a slight gap is formed between the ratchet 10 and the guide 20. As a result, the ratchet 10 and the guide 20 are held so as to be smoothly relatively rotated between the ratchet holding surface 31 and the guide holding surface 32. A condition in which the set plate 30 is assembled is shown in FIG. 5.

Next, the three pawls 40a-40c will be described. As shown in FIG. 1, each of the pawls 40a-40c is formed as a plate-shaped piece. Further, as shown in FIG. 6, the pawls 40a-40c are respectively disposed in the guide grooves 22a-22c that are formed in the inner disc surface 20a of the guide 20. As a result, both sides of each of the pawls 40a-40c are guided by each of the depressed guide groove portions 22a-22c, so that each of the pawls 40a-40c can be advanced and retracted only in the radial direction of the guide 20. Outer teeth 41a-41c are respectively formed in radially outer surfaces of the pawls 40a-40c. The outer teeth 41a-41c are shaped so as to be capable of meshing with the inner teeth 11a formed in the ratchet 10. Therefore, in a condition that the reclining device 4 is assembled, upon advancing the pawls 40a-40c radially outwardly, the outer teeth 41a-41c can mesh with the inner teeth 11a of the ratchet 10. As a result, the ratchet 10 and the guide 20 can be restricted from relatively rotating via the pawls 40a-40c that are guided by the guide 20. Thus, the reclining device 4 is placed in the locked condition.

Here, the advancing and retracting motion of each of the pawls 40a-40c is performed by rotational motion of the rotating cam 50 that is disposed at the central portion of the guide 20. In particular, drawing back grooves 42a-42c and engaging portions 43a-43c are formed in radially inner portions of the pawls 40a-40c. The drawing back grooves 42a-42c respectively function to draw back operation arms 51a-51c formed in the rotating cam 50. The engaging portions 43a-43c respectively function to engage operation arms 51a-51c formed in the rotating cam 50. Each of the drawing back grooves 42a-42c is formed so as to have a drawing back shape that can receive the operation arms 51a-51c therein when the rotating cam 50 rotates. Further, each of the engaging portions 43a-43c is formed so as to have a shape that can engage the operation arms 51a-51c when the operation arms 51a-51c are received in the drawing back grooves 42a-42c. Therefore, when the operation arms 51a-51c are received in the drawing back grooves 42a-42c, the pawls 40a-40c are drawn radially inwardly by the engaging portions 43a-43c. A condition in which the pawls 40a-40c are drawn radially inwardly is indicated by broken lines in FIG. 6.

Because the three pawls 40a-40c are positioned at intervals of 90 degrees, three spacing distances D1 to D3 are defined in the reclining device 4 along a circumferential direction thereof. In particular, the spacing distance D1 is an interval distance between the pawl 40a and the pawl 40c. The spacing distance D2 is an interval distance between the pawl 40a and the pawl 40b. Further, the spacing distance D3 is an interval distance between the pawl 40b and the pawl 40c. The spacing distance D1 is determined so as to be greater than the remaining two spacing distances D2 and D3. In addition, the two spacing distances D2 and D3 are determined so as to be smaller than a circumferential length of the raised flat portion 11b described above.

Next, referring to FIG. 1 again, the rotating cam 50 will be described. The rotating cam 50 is axially rotatably positioned at a central portion of the inner disc surface 20a of the guide 20. In particular, as shown in FIG. 6, the rotating cam 50 is disposed in the guide groove portions 22a-22c, so as to be positioned radially inwardly relative to the three pawls 40a-40c that is positioned in the guide groove portions 22a-22c.

The rotating cam 50 has the operation arms 51a-51c extending radially outwardly and are formed at three circumferential positions that correspond to the pawls 40a-40c. The operation arms 51a-51c are shaped so as to extend outwardly from a peripheral portion of the rotating cam 50 in a clockwise direction as seen in the drawings. When the rotating cam 50 is rotated clockwise, for example, from a condition as indicated by solid lines in FIG. 6, the operation arms 51a-51c enter the drawing back grooves 42a-42c formed in the pawls 40a-40c, so as to be engaged with the engaging portions 43a-43c. As a result, as indicated by broken lines in this drawing, the pawls 40a-40c are respectively drawn radially inwardly due to the clockwise rotation of the rotating cam 50. Also, when the rotating cam 50 is rotated counterclockwise from a condition as indicated by broken lines, the operation arms 51a-51c may push the pawls 40a-40c radially outwardly along inner peripheral surfaces of the drawing back grooves 42a-42c. As a result, as indicated by solid lines in this drawing, the outer teeth 41a-41c of the pawls 40a-40c are pressed against the inner teeth 11a of the ratchet 10. The rotating cam 50 is connected with the hinge cam 60 which will be described hereinafter, so as to be normally rotationally biased counterclockwise. As a result, the pawls 40a-40c are normally maintained in a condition in which they are biased and pressed against the inner peripheral surface of the ratchet 10 by the rotating cam 50. As well shown in FIG. 1, formed at a central portion of the rotating cam 50 is a fitting hole 52 that can receive the hinge cam 60 therein.

Referring to FIG. 6 again, the rotating cam 50 has the support portion 51d of which the peripheral edge portion is partially swollen radially outwardly. The support portion 51d is formed at a circumferential position that correspond to the support portion 23. The support portion 51d is shaped so as to be arcuately swollen, so that the outer peripheral surface of the support portion 51d can contact an inner peripheral surface of the support portion 23. As a result, a reaction force generated when the rotating cam 50 presses the pawls 40a-40c against the inner peripheral surface of the ratchet 10 is received by the support portion 23 that contacts the outer peripheral surface of the support portion 51d. That is, when the rotating cam 50 presses the circumferentially unevenly positioned three pawls 40a-40c against the inner peripheral surface of the ratchet 10, the rotating cam 50 receives a circumferentially uneven reaction force. However, this uneven reaction force is supported by the fact that the support portion 51d may contact the support portion 23. That is, the circumferential reaction force applied to the rotating cam 50 can be uniformized by the pawls 40a-40c and the support portion 51d that are respectively positioned at the intervals of 90 degrees. As a result, the pawls 40a-40c can be stably pressed against the inner peripheral surface of the ratchet 10.

Next, referring to FIG. 1 again, the hinge cam 60 will be described. The hinge cam 60 is shaped so as to be fitted into the fitting hole 52 of the rotating cam 50. The hinge cam 60 is shaped so as to receive the operation shaft (not shown) described above therein in order to be integrally connected thereto. Thus, the hinge cam 60 is capable of integrally axially rotating therewith when the operation shaft is axially rotated. FIG. 6 shows a condition in which the hinge cam 60 is fitted into the fitting hole 52 of the rotating cam 50. As shown in this drawing, the hinge cam 60 has a pressing portion 61 that is formed at a circumferential portion thereof so as to be protruded radially outwardly. When the hinge cam 60 axially rotates, the pressing portion 61 presses an inner peripheral surface of the fitting hole 52, thereby rotating the rotating cam 50 in the direction.

Figure 3:
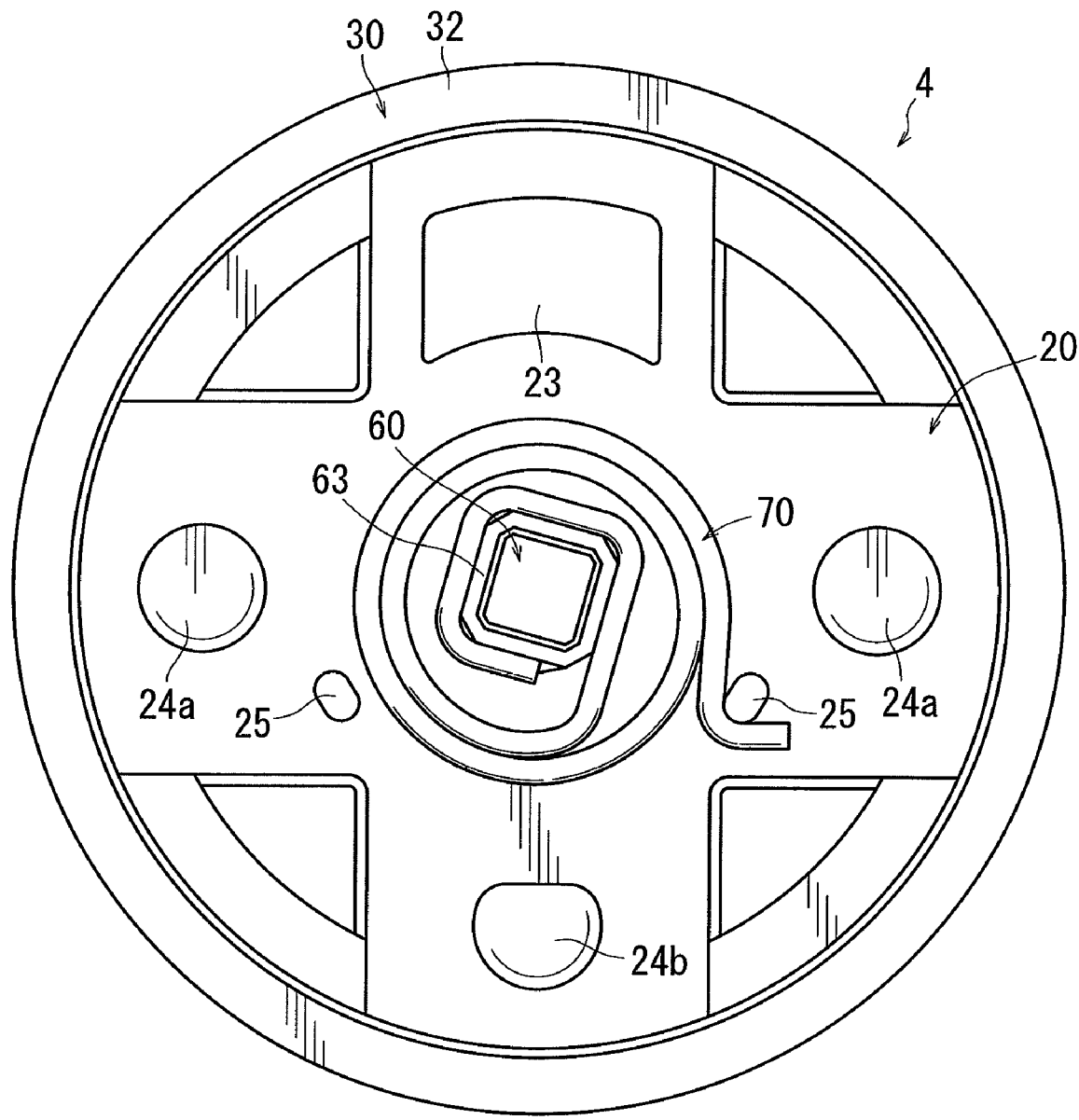
FIG. 3 is a front view of the reclining device.
Figure 4:
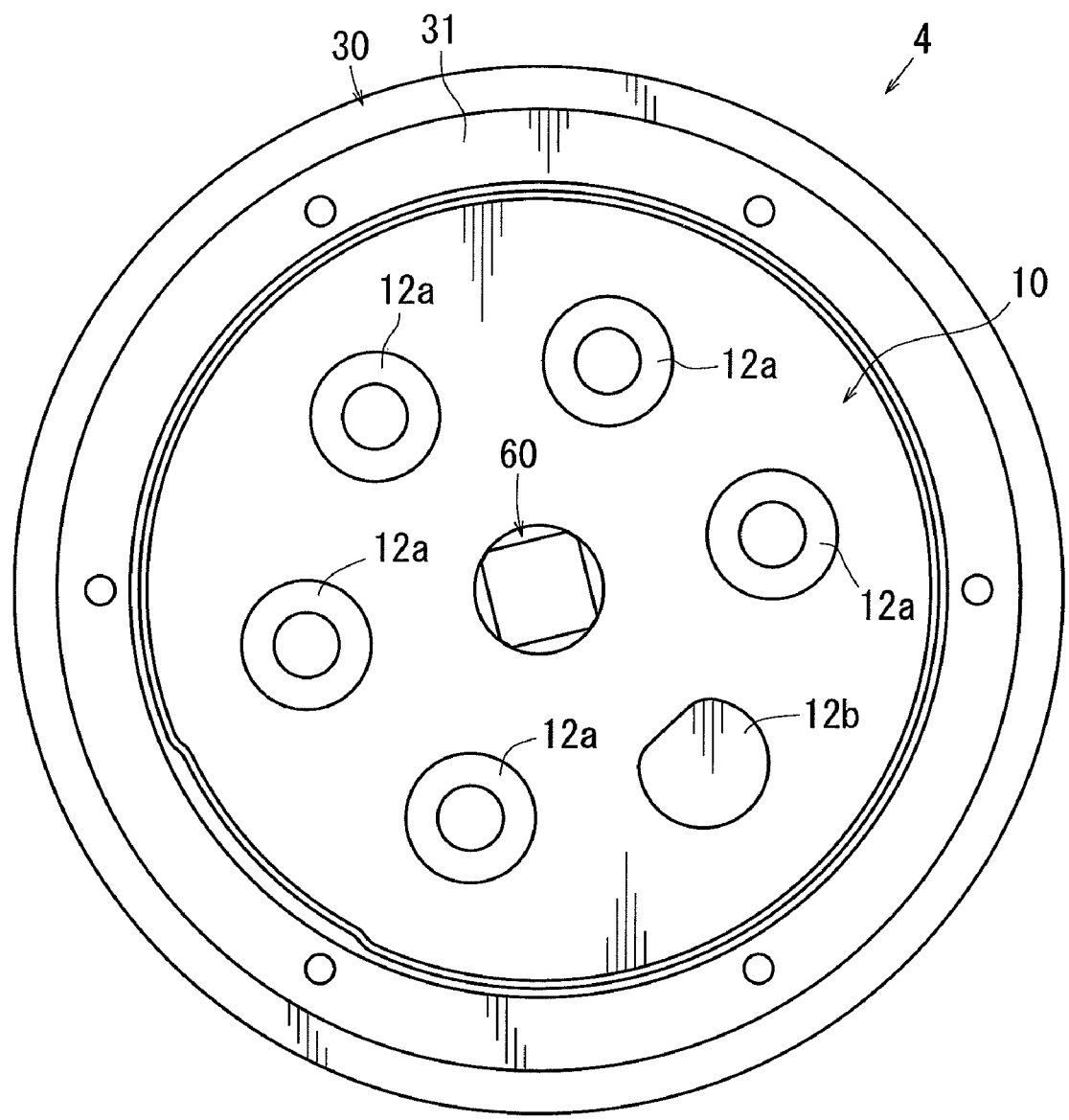
FIG. 4 is a rear view of the reclining device.

Referring to FIG. 1 again, the hinge cam 60 has a cylindrical shaft portion 62 that is formed at a central portion thereof so as to protrude in one direction along an axial direction. Further, the cylindrical shaft portion 62 is inserted into the shaft insertion hole 20c of the guide 20, so that the hinge cam 60 is axially rotatably supported by the guide 20. Further, formed in a forward end of the shaft portion 62 is a square engaging portion 63 that is capable of engaging an inner end of the spring member 70 described below. The engaging portion 63 is shaped so as to protrude from the outer disc surface 20b of the guide 20 in a condition in which the shaft portion 62 is inserted into the shaft insertion hole 20c of the guide 20. Therefore, the engaging portion 63 engages the inner end of the spring member 70 at the projected position thereof. FIG. 3 shows an engaging condition of the spring member 70. As shown in this drawing, an inner end of the spring member 70 engages an inner end of the hinge cam 60, and an outer end thereof engages a pin-shaped engaging portion 25 that protrudes from the outer disc surface 20b of the guide 20. As a result, the hinge cam 60 is normally biased counterclockwise as seen in FIG. 6 by a biasing force of the spring member 70. As a result, the hinge cam 60 biases the rotating cam 50 counterclockwise, thereby pushing the pawls 40a-40c radially outwardly. Thus, the pawls 40a-40c mesh with the inner teeth 11a of the ratchet 10, so that the reclining device 4 can be maintained in the locked condition.

As described above, the hinge cam 60 is rotationally integrally connected to the operation shaft (not shown). Further, the operation shaft is integrally connected to the operation lever U described with reference to FIG. 2, so as to be rotated by performing the pulling operation of the operation lever U. In particular, when the pulling operation of the operation lever U is performed, the operation shaft rotates the hinge cam 60 clockwise against the above-mentioned biasing force as shown in FIG. 6. As a result, the hinge cam 60 rotates the rotating cam 50 clockwise, thereby radially inwardly drawing back the pawls 40a-40c that mesh with the inner teeth 11a of the ratchet 10. As a result, the reclining device 4 is switched to the unlocked condition. Further, when the pulling operation of the operation lever U (see FIG. 2), the hinge cam 60 is rotated counterclockwise by the biasing force thereof, thereby meshing the pawls 40a-40c with the inner teeth 11a of the ratchet 10 again. Thus, the reclining device 4 can be switched to the locked condition.

Referring to FIG. 2, when the seat back 2 is in a condition that it is completely backwardly tilted (a condition indicated by broken lines), the reclining device 4 is placed in a rotating position shown in FIG. 6. That is, the reclining device 4 is in a rotating position in which the raised flat portion 11*b* formed in the inner peripheral surface of the ratchet 10 is circumferentially adjacent to the pawl 40*c* positioned at a right side as seen in the drawing. In this condition, the raised flat portion 11*b* is positioned in a region of the spacing distance D1, so as to not interfere with either of the pawls 40*a*-40*c* that are pushed by the rotating cam 50. Therefore, in this condition, when the pawls 40*a*-40*c* are pushed by the rotating cam 50, the pawls 40*a*-40*c* can mesh with the inner teeth 11*a* of the ratchet 10.

Figure 7:
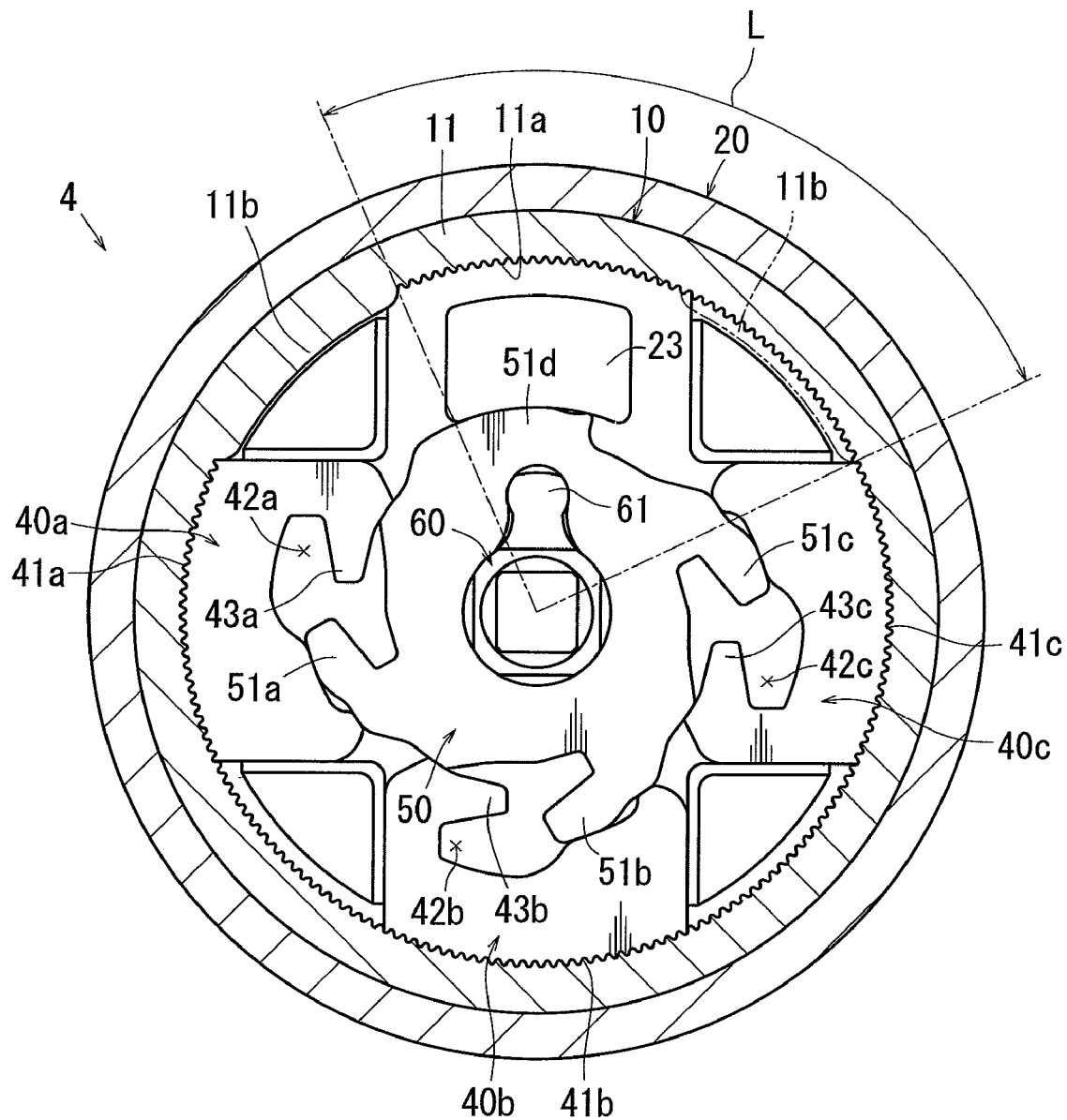
FIG. 7 is a schematic view, which illustrates a condition in which a raised flat portion formed in a ratchet is in a lock zone.

Referring to FIG. 2, when the seat back 2 is raised from the above-mentioned condition in which the seat back 2 is completely tilted backwardly, the raised flat portion 11*b* rotates counterclockwise from the condition indicated by broken lines in FIG. 7. Further, as a result of the above-mentioned counterclockwise rotation of the raised flat portion 11*b*, in a range of rotation before the raised flat portion 11*b* reaches a rotating position in which it is circumferentially adjacent to the pawl 40*a* indicated by solid lines of FIG. 7 that is positioned at a left side as seen in the drawing, the raised flat portion 11*b* does not interfere with either of the pawls 40*a*-40*c* pushed by the rotating cam 50. A rotation region in which the raised flat portion 11*b* does not interfere with the pawls 40*a*-40*c* will be determined as the lock zone L in which the reclining device 4 can be placed in the locked condition when a rotating operation of the operation lever U (see FIG. 2) is stopped. In this embodiment, the lock zone L is set to have an angle range of 88 degrees. Shown by solid lines in FIG. 2 is a condition in which the seat back 2 is raised to a boundary position of the lock zone L.

Figure 8:
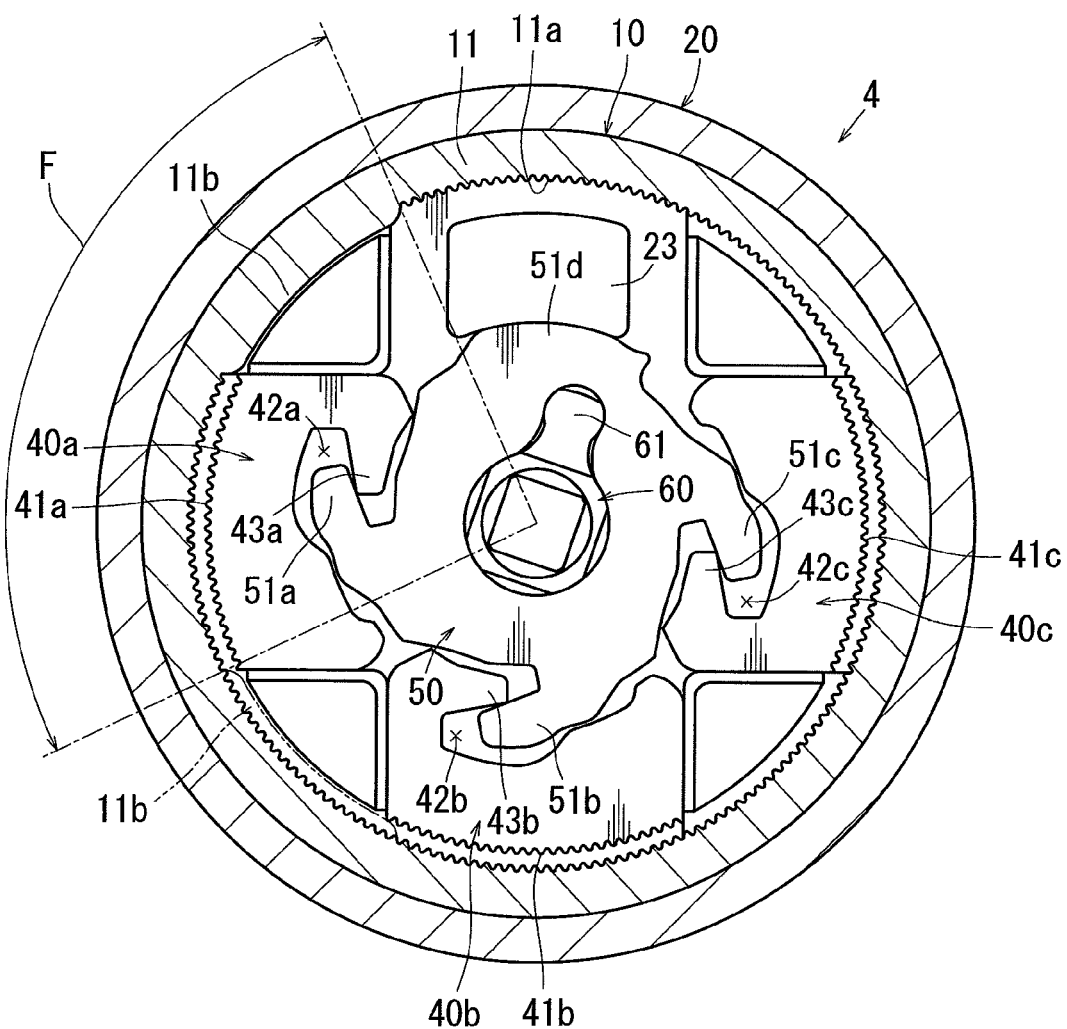
FIG. 8 is a schematic view, which illustrates a condition in which the raised flat portion formed in the ratchet is in a free zone.

Further, referring to FIG. 2, when the seat back 2 is further rotated in a forwardly tilting direction from the boundary position of the lock zone L indicated by solid lines, the raised flat portion 11*b* further rotates counterclockwise from a rotating position indicated by solid lines in FIG. 8. Further, the rotating position as indicated by solid lines in FIG. 8 is the same as the rotating position as indicated by the solid line of FIG. 7. As a result, the raised flat portion 11*b* moves to a rotating position in which the raised flat portion 11*b* circumferentially overlaps the pawl 40*a* positioned at the left side as seen in the drawing. In this rotating position, the raised flat portion 11*b* interferes with the pawl 40*a* pushed by the rotating cam 50. As described above, the raised flat portion 11*b* is shaped to protrude radially inwardly beyond the tips of the inner teeth 11*a*. Therefore, due to the interference of the raised flat portion 11*b* with the pawl 40*a*, the counterclockwise rotation of the rotating cam 50 to push the pawl 40*a* outwardly is restricted, so that the pawls 40*a*-40*c* and the inner teeth 11*a* of the ratchet 10 are prohibited from meshing with each other.

As described above with reference to FIG. 6, the circumferential length of the raised flat portion 11*b* is determined so as to be greater than the spacing distance D2 and the spacing distance D3. Therefore, when the raised flat portion 11*b* is positioned in the region of the spacing distance D2 or the spacing distance D3 as a result of its counterclockwise rotation, the raised flat portion 11*b* always interferes with at least one of the pawls 40*a* and 40*b* that are positioned circumferentially across the spacing distance D2 or at least one of the pawls 40*b* and 40*c* that are positioned circumferentially across the spacing distance D3. Further, when the raised flat portion 11*b* is positioned so as to circumferentially overlap the pawl 40*b* that is positioned at a lower side as seen in the drawings or the pawl 40*c* that is positioned at the right side as seen in the drawings, the raised flat portion 11*b* may also interfere with the pushed pawl 40*b* or pawl 40*c*. That is, as shown in FIG. 8, in this embodiment, all of remaining rotation regions in which the raised flat portion 11*b* can be rotated counterclockwise from the rotating position indicated by solid lines is determined as the free zone F in which the reclining device 4 is maintained in the unlocked condition even if the rotating operation of the operation lever U (see FIG. 2) is stopped. Referring to FIG. 2, in this embodiment, the rotation region before the seat back 2 reaches the position in which it is folded onto the seat cushion 3 after the seat back 2 is tilted forwardly from the boundary position of the lock zone L indicated by solid lines is determined as the free zone F. The free zone F is set to have an angle range of 92 degrees.

Figure 9:
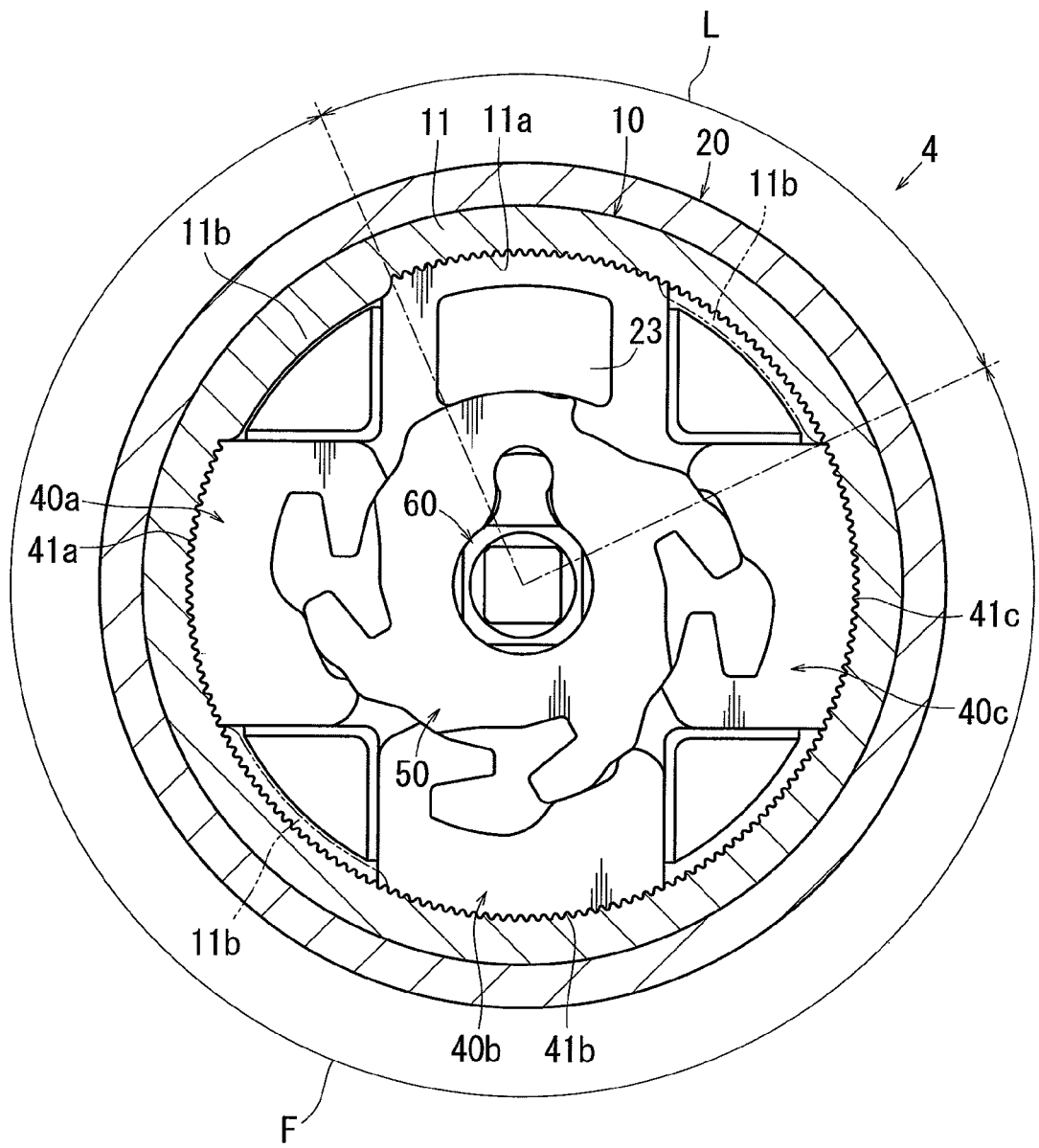
FIG. 9 is a schematic view, which illustrates the lock zone and the free zone of the reclining device.

That is, as shown in FIG. 9, in the reclining device 4 of this embodiment, all of the rotation regions except for the above-mentioned lock zone L is determined as the free zone F. As a result, a set of rotational regions that is composed of the lock zone L and the free zone F that is continued from the lock zone L can cover a wide angle range of 360 degrees at the maximum.

Next, referring to FIG. 2, a method of using this embodiment will be described. In an initial condition of the seat 1, the seat back 2 is in a raised condition indicated by solid lines. In this condition, the reclining device 4 is in the rotation region of the lock zone L, so as to be in the locked condition in which the tilting angle of the seat back 2 is fixed.

First, a method for tilting the seat back 2 forwardly from the initial condition toward the seat cushion 3 so as to place the same to a folded condition will be first described. As a first step, the operation lever U is pulled upwardly so as to switch the reclining device 4 to the unlocked condition. As a result, the seat back 2 is rotated by the biasing force that is applied in the forwardly tilting direction, so as to be folded onto an upper side of the seat cushion 3. At this time, the reclining device 4 is placed in the rotation region of the free zone F after the seat back 2 is somewhat tilted forwardly from the above-described position shown by solid lines. Therefore, in this condition, even if the pulling operation of the operation lever U is stopped, the reclining device 4 can be maintained in the unlocked condition. As a result, the seat back 2 can be automatically tilted and folded forwardly without continuing the operation of the operation lever U.

Next, a method for returning the seat back 2 from the folded attitude to the original raised condition will be described. In this case, the seat back 2 may be simply raised against the biasing force that is applied in the forwardly tilting direction. That is, because the reclining device 4 is maintained in the unlocked condition until the seat back 2 is raised to the raised condition, the seat back 2 can be raised without continuing the operation of the operation lever U. Further, when the seat back 2 reaches the raised condition, the reclining device 4 is automatically placed in the lock zone L so as to be switched to the locked condition. As a result, the seat back 2 is fixed to the inclination angle corresponding to the raised condition.

Next, a method for tilting the seat back 2 backwardly from the raised condition will be described. As a first step, the operation lever U is pulled upwardly so that the reclining device 4 is switched to the unlocked condition. Thereafter, the seat back 2 is tilted backwardly against the biasing force that is applied in the forwardly tilting direction while the operation lever U is operated, so as to adjust the inclination angle thereof. Thereafter, when the pulling operation of the operation lever U is stopped, the reclining device 4 is switched to the locked condition. As a result, the inclination angle of the seat back 2 is fixed to the adjusted position. The inclination angle of the seat back 2 can be adjusted up to an angle corresponding to the backwardly tilted position indicated by broken lines in the drawing.

Thus, according to the reclining device 4 of this embodiment, with regard to the spacing distances D1 to D3 of the three pawls 40a-40c that are circumferentially positioned, the spacing distance D1 is determined so as to be greater than the other two spacing distances D2 and D3, and the two smaller spacing distances D2 and D3 is determined so as to be smaller than the circumferential length of the raised flat portion 11b. Therefore, lock strength of the reclining device 4 constructed as the rotation lock device is increased. Further, the lock zone L and the free zone F can be determined so as to extend over a continuous wide range without separately providing an assembly component such as a free zone plate.

Further, due to the support portion 23 that is capable of equalizing the circumferentially uneven reaction force applied to the rotating cam 50, the engagement between the pawls 40a-40c and the ratchet 10 can be stabilized, thereby increasing the lock strength of the reclining device 4. Further, the support portion 23 is formed by half blanking the guide 20. Therefore, the support portion 23 having an increased support strength can be easily formed. Moreover, because the three pawls 40a-40c and the support portion 23 are equi-angularly positioned at intervals of 90 degrees, the three pawls 40a-40c can be pushed toward the inner teeth 11a of the ratchet 10 via the rotating cam 50 while a circumferentially equalized force is applied thereto. Therefore, the lock strength of the reclining device 4 can be increased.

Second Embodiment

Figure 12:
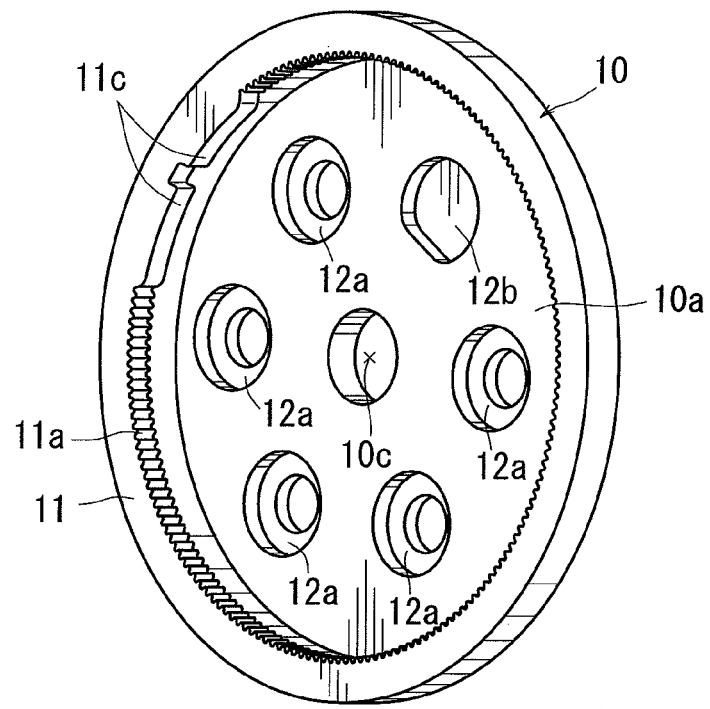
FIG. 12 is a front view of a ratchet, which illustrates construction of a raised flat portion according to a second embodiment.

Next, construction of the reclining device 4 of a second embodiment will be described with reference to FIG. 12. The reclining device 4 of this embodiment differs from the reclining device 4 of the first embodiment only in the construction of the ratchet 10. Thus, FIG. 12 illustrates the construction of the ratchet 10 as an enlarged view.

In this embodiment, a raised flat portion 11c formed in the ratchet 10 is divided into two parts in a circumferential direction. Similar to the raised flat portion 11b of the first embodiment (see FIG. 1), the raised flat portion 11c is formed as a non-toothed portion having no teeth in the inner peripheral surface thereof, and is formed so as to be protruded radially inwardly beyond the tips of the inner teeth 11a. Further, similar to the raised flat portion 11b of the first embodiment (see FIG. 6), a circumferential length of the raised flat portion 11c, i.e., a circumferential length measured between ends of the raised flat portion 11c as a whole is determined so as to be greater than the two spacing distances D2 and D3.

Thus, although the raised flat portion 11c is formed so as to be circumferentially intermittently protruded, the same effect as the raised flat portion 11b of the first embodiment can be obtained.

Third Embodiment

Figure 13:
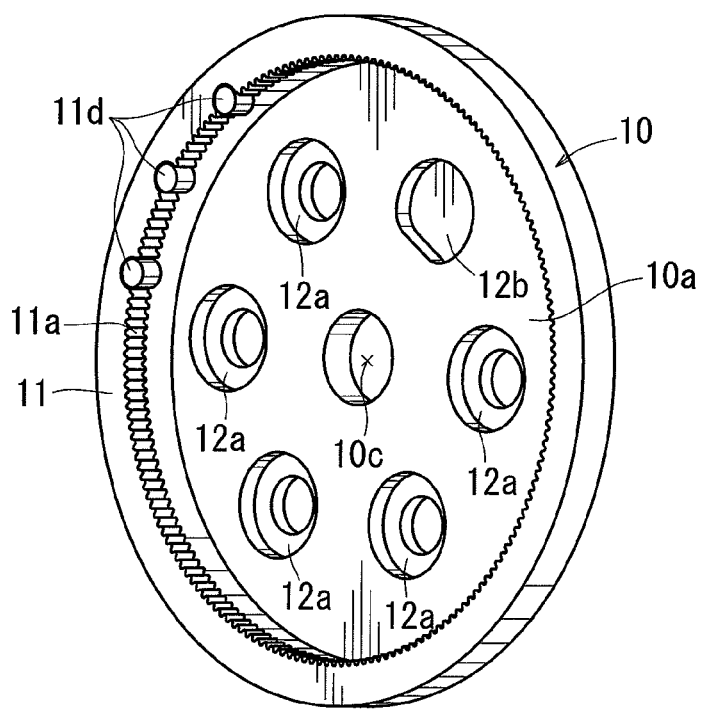
FIG. 13 is a front view of a ratchet, which illustrates construction of a raised flat portion according to a third embodiment.

Next, construction of the reclining device 4 of a third embodiment will be described with reference to FIG. 13. The reclining device 4 of this embodiment differs from the reclining device 4 of the first embodiment only in the construction of the ratchet 10. Thus, FIG. 13 illustrates the construction of the ratchet 10 as an enlarged view.

In this embodiment, a raised flat portion formed in the ratchet 10 is formed by a plurality of pin members 11d that are embedded in the inner peripheral surface of the ratchet 10. The pin members 11d are embedded in three circumferential positions on the inner circumferential surface of the ratchet 10, and each of their outer peripheral surfaces is formed as a non-toothed smooth surface. Further, similar to the raised flat portion 11b of the first embodiment (see FIG. 1), the pin members 11d are positioned so as to be protruded radially inwardly beyond the tips of the inner teeth 11a. Further, similar to the raised flat portion 11b of the first embodiment (see FIG. 6), a circumferential length measured between the pin members 11d positioned at both ends is determined so as to be greater than the two spacing distances D2 and D3.

Thus, although a plurality of pin members 11d corresponding to the raised flat portion are circumferentially positioned at desired intervals, the same effect as the raised flat portion 11b of the first embodiment can be obtained.

The present invention can be carried out in various modes other than the three embodiments described above.

For example, the rotation lock device of the present invention is not restricted to the reclining devices of the embodiments described above, and can be applied to various connection structures connecting members that are coaxially arranged so as to be capable of relatively rotating.

Further, the reclining device can be constructed such that the ratchet and the guide can be connected to the seat cushion side and the seat back side.

Also, it is possible to omit the support portion that receives an uneven pressing force of the rotating cam. However, in this case, because a circumferentially uneven reaction force of the pressing force is applied to the rotating cam, the lock strength of the reclining device can be reduced as compared with the constructions of the embodiments described above. Further, a corresponding uneven load can be applied to other components such as the hinge cam.

Further, in the embodiments described above, three pawls are positioned on the guide at intervals of 90 degrees in the circumferential direction. However, there are no particular limitations with regard to the three spacing distances as long as one of them is determined so as to be greater than the other two of them.

Further, the raised flat portion is not restricted to a flat shape. For example, the raised flat portion may have curved shape that is curved so as to not mesh with the outer teeth of the pawls.

The invention claimed is:

1. A rotation lock device disposed between a first member and a second member that are coaxially rotatably positioned and connecting the first and second members, the rotation lock device being capable of having an unlocked condition allowing relative rotation of the first and second members and a locked condition preventing the relative rotation of the first and second members, comprising:
   a ratchet that is coaxially disposed on and connected to one of the first and second members and having a disk-shape, the disk-shaped ratchet having a cylindrical portion axially protruding from an outer peripheral edge portion thereof and having inner teeth that are formed in an inner circumferential surface of the cylindrical portion;
   a guide that is coaxially disposed on and connected to the other of the first and second members and having a disk-shape, the guide being combined to the ratchet while disc surfaces thereof face each other, so as to be rotated relative to each other;
   three pawls that are disposed on the guide disc surface facing the ratchet at intervals in a circumferential direction of the guide, the pawls being retained on the guide, so as to be movable only in a radial direction of the guide, and having outer teeth that are formed in radially outer surfaces thereof; and a cam that is coaxially disposed on said guide so as to be axially rotated, the cam being capable of pushing said three pawls from inside to outside along a radial direction of the guide when it is axially rotated, thereby meshing the outer teeth of the pawls with the inner teeth formed in the inner circumferential surface of the cylindrical portion of said ratchet, wherein three spacing distances are defined due to circumferential positioning of said three pawls, one of the spacing distances being determined so as to be greater than the remaining two spacing distances, and wherein a raised flat portion is formed in a portion of the inner circumferential surface of the cylindrical portion of said ratchet at a single site in a circumferential direction thereof, the raised flat portion lacking said inner teeth and being protruded radially inwardly beyond tips of said inner teeth and in which said inner teeth is removed, wherein the smaller remaining two spacing distances are determined so as to be smaller than a circumferential length of said raised flat portion.

2. A rotation lock device according to claim 1, wherein the three spacing distances defined due to the positioning of said three pawls are determined such that in a region in which said raised flat portion moves between the three pawls through the smaller remaining two spacing distances, at least one of the pawls defining the smaller spacing distances and the raised flat portion always contact each other when the pawls are pushed.

3. A rotation lock device according to claim 1, wherein said guide is integrally provided with a support portion that is capable of contacting an outer circumferential surface of said cam and supporting the same, and wherein the support portion is positioned at the greater one of the spacing distances defined by said three pawls.

4. A rotation lock device according to claim 3, wherein said support portion is formed by half blanking said disc-shaped guide in a thickness direction thereof.

5. A rotation lock device according to claim 3, wherein said three pawls and said support portion are positioned on the disc surface of said guide at intervals of 90 degrees in the circumferential direction thereof.

* * * * *